April 9, 1935.  A. OHLHANS  1,997,388
TELEMETERING SYSTEM
Filed July 20, 1929
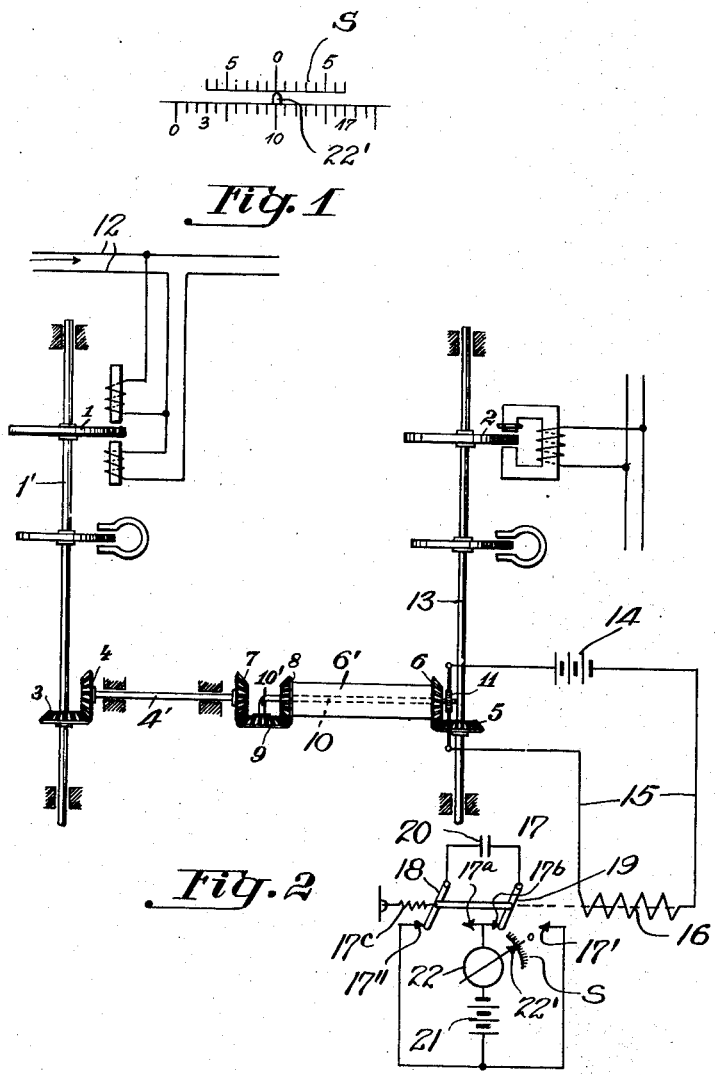
INVENTOR
ARNIM OHLHANS
BY
ATTORNEYS Patented Apr. 9, 1935

1,997,388

UNITED STATES PATENT OFFICE 1,997,388

TELEMETERING SYSTEM

Arnim Ohlhans, Berlin-Charlottenburg, Germany, assignor to Siemens & Halske, Aktiengesellschaft, Siemensstadt, near Berlin, Germany, a corporation of Germany Application July 20, 1929, Serial No. 379,606
In Germany July 30, 1928

9 Claims. (Cl. 177—351)

Various electrical systems have been devised for indicating at a distance, the condition of an appliance or instrument which varies in speed or some other factor. For instance, the number of revolutions of an electricity meter has been transmitted over a line, by current impulses, to an ammeter located at a distant point, so that such ammeter would furnish an indication of the amperes or watts registered by said electricity meter. This prior arrangement required an interrupter on the rotary member of the electricity meter, to produce a number of impulses of constant strength at each revolution, which impulses were transmitted over the line to an indicating instrument (ammeter) the deflection of which was proportional to the number of impulses per unit of time, and therefore constituted a measure of the number of revolutions of the electricity meter. One drawback of this prior device was that it failed to indicate the direction or arithmetical sign (+ or —) of the energy acting on the transmitting electricity meter and therefore the direction in which such meter was rotating at the time, that is to say, a positive energy output of the magnitude $m$ would, in this prior arrangement, produce exactly the same deflection of the ammeter pointer at the distant point as a negative energy output of said magnitude $m$; or in other words, the ammeter would give no indication of the direction in which the electricity meter was rotating.

My present invention provides a system in which the number of impulses operating the distant indicator depends not only on the absolute magnitude of the quantity or factor to be indicated (such as, number of revolutions, or amperes, or watts, etc.), but the positive or negative character (direction) of such quantity or factor. In the preferred embodiment of my invention, I employ a device which rotates at a constant speed greater than the maximum number of revolutions of the electricity meter or other transmitting member, and the variable number of revolutions of said transmitting member is, according to its direction, either added to or subtracted from the constant number of revolutions of said device, and a number of impulses corresponding to such sum or difference (which can never become less than zero) is transmitted to the indicating instrument.

Reference is to be had to the accompanying drawing, in which Fig. 1 is a diagram illustrating the relation between the scale at the receiving station and the throw or deflection of the indicating pointer at said station; and Fig. 2 is a diagrammatic view of a transmitting apparatus and a receiving or indicating apparatus according to my invention, it being understood that this embodiment is but an example of the many forms which may be used for my improved system.

In Fig. 1, the upper scale S, which in this particular embodiment extends from —7 to +7, is the one provided in connection with the indicating instrument 22 located at the receiving station. The lower scale of Fig. 1 need not be used in such instrument (although it may be), but has been shown chiefly to illustrate the principle of my invention. If said instrument received no impulses, its pointer 22' would be in line with the zero mark of the lower scale in Fig. 1. In the operation of the system, however, the indicator 22 always receives impulses (as explained below) the number of which is either the sum of a variable number depending on the operation of the device the indications of which are to be transmitted, and a constant number, or the difference between said constant number and said variable number. When the indicator 22 receives only said constant number of impulses, the indicator pointer 22' will register with the zero mark of the upper scale S in Fig. 1, which in this particular instance coincides with the 10 mark of the lower scale in Fig. 1. If the electricity meter or other device whose indications are to be transmitted, rotates in one direction, impulses produced by such rotation will, as it were, be added to the constant number of impulses mentioned above, and the pointer 22' will move to the right of the zero point of the upper scale S in Fig. 1; if rotation of the electricity meter or other device is in the opposite direction, the impulses produced by such opposite rotation will, as it were, be subtracted from the constant number of impulses mentioned above, and the pointer 22' will move to the left of the zero point of the upper scale S in Fig. 1. In no case however will the pointer move beyond (to the left of) the zero mark of the lower scale in Fig. 1. This result is insured by giving such a value to the above mentioned constant number of impulses that it will always be greater than the maximum number of variable impulses. The scale S of Fig. 1 assumes that the maximum throw or deflection, from the zero point of said scale, will correspond to the indication +7 or —7 of said scale, that is to say, the maximum deflection from the zero point of the scale S will be less than the basic deflection (10 degrees from the zero point of the lower scale) due to the constant number of impulses alone.

The apparatus for carrying out the principle explained above, may be constructed as illustrated by Fig. 2. An energy meter 1 has a rotary member or armature mounted rigidly on the shaft 1', said meter being operated, for instance, according to the Ferraris principle, by the current flowing through the double line 12. The number of revolutions of said shaft will vary, being in direct ratio to said current, and the direction of rotation will depend on the direction of the current. At 2 I have indicated a device (which may be an electric drive of the Ferraris type) for rotating another shaft, 13, in a predetermined direction at a constant rate of speed. A clockwork or any outer suitable means may be substituted for rotating said shaft 13 at a constant speed.

On the shafts 1' and 13 are secured rigidly the bevel wheels 3 and 5 respectively, the wheel 3 meshing with a bevel wheel 4 on a transverse shaft 4', while the wheel 5 meshes with a bevel wheel 6 on a transverse sleeve or tubular shaft 6', which also carries a second bevel wheel 8. The shaft 4' likewise carries rigidly a second bevel wheel 7, and the two bevel wheels 7, 8 are in mesh with a planet bevel wheel 9 mounted on the radial end portion 10' of a shaft 10 extending through the sleeve 6', said sleeve being co-axial with the shafts 4' and 10. This bevel wheel mechanism is of the character of a differential gear.

On the shaft 10 is mounted the contact disc of an interrupter 11 of any well-known or approved type, to make and break a circuit in which there is included a battery or other source of electric current 14, the line 15, the contact brushes of said interrupter 11, and the coil 16 of a relay 17 located at the distant station. It will be understood that the parts designated by the numerals 1 to 13 inclusive are located at the transmitting station, while the parts designated by the numerals from 16 upward are located at the receiving station, the said stations being connected by the line 15. The relay 17 is shown as a double-pole, double-throw switch, its members 18 and 19 being connected with the opposite plates of a condenser 20. The relay contacts are arranged in pairs, those of one pair, 17', 17'', being connected with one terminal of the battery or other source of electricity 21, the other pole of said battery being connected with the relay contacts of the other pair, 17ᵃ, 17ᵇ, by a connection which includes the indicating or measuring instrument 22, having the indicating hand or pointer 22' which co-operates with the scale S mentioned above.

At each of the impulses produced by the action of the interrupter 11, the coil 16 will be energized and the double switch 18, 19 will be thrown over to the position in which it engages the contacts 17', 17ᵃ, so that the condenser 20 will be discharged through the indicating instrument 22. When the current is interrupted in the line 15, the switch 18, 19 will return to engagement with the contacts 17'', 17ᵇ, as shown (under the influence of a spring 17ᶜ), and the current of the battery 21 will charge the condenser 20. Each discharge of the condenser will supply a definite amount of energy to the instrument 22, and the extent to which the pointer 22' is deflected will depend on the number of discharges or impulses per unit of time.

This number of impulses will in turn depend on the number of revolutions of the interrupter 11 and its shaft 10. If only the shaft 13 is rotating (that is, assuming the shaft 1' to be stationary), the number of impulses will be such that the pointer 22' will be deflected to the zero point of the scale S. If the meter 1 is in operation and its shaft 1' rotates in a certain direction, the differential gear mechanism 3—9 will add to the constant number of impulses due to the rotation of the shaft 13 alone, a variable number of impulses depending on the speed at which the shaft rotates, and the pointer 22' will be given an increased deflection, so that it will stand to the right of the zero point of the scale S. When, however, the meter shaft 1' rotates in the opposite direction, the differential gear will subtract from the constant number of impulses due to the rotation of the shaft 13 alone, a variable number of impulses depending on the speed at which the shaft 1' rotates in such opposite direction, and the pointer 22' will stand to the left of the zero point of scale S, without however reaching a position corresponding to the zero point of the lower scale in Fig. 1. In other words, while the meter 1 is operating, the deflections of the pointer 22' from the position of rest will always be in the same direction, irrespective of the direction in which the meter shaft 1' is rotating, but such pointer will be to one side of the zero mark of the scale S when the meter shaft 1' is rotating in one direction and on the other side of said zero mark when the meter shaft 1' rotates in the opposite direction. The instrument 22 will therefore indicate not only the speed at which the shaft 1' rotates (or the watts or other quantity corresponding to such speed), but the direction of such rotation as well.

In the above example an arrangement is described in which the variable rotation of the energy meter is added to, or subtracted from, a constant rotation. The same action could be produced by an additional constant turning moment or torque acting on the shaft of the energy meter 1 by means of suitable coupling, or by arranging for the contact brushes which in the above description have been assumed as stationary, to rotate in the reverse direction to the contact disc which is carried around by the meter.

These and various other modifications may be made without departing from the nature of my invention as defined in the appended claims.

I claim:

1. In a transmitter for telemeter systems, a reversible shaft and means for driving it at a speed and in a direction depending on the magnitude and on the positive or negative character of value to be transmitted, another shaft, means for driving said second shaft continuously in the same direction at a constant speed, a device for producing electric impulses, and differential mechanism connecting said device with both of said shafts, to cause the number of impulses produced per unit of time to correspond to the relative velocity of said shafts.

2. In a transmitter for telemeter systems, a reversible shaft and means for driving it at a speed and in a direction depending on the magnitude and on the positive or negative character of value to be transmitted, another shaft co-axial with the first-mentioned shaft, means for driving said second shaft continuously in the same direction at a constant speed, wheels secured to said shafts and co-axial therewith, a planet wheel meshing with both of said wheels, a device, operatively connected with said planet wheel, for producing electric impulses the number of which per unit of time corresponds to the relative velocity of said shafts, and a measuring instrument connected with said device for indicating the algebraic sum of the influence which said shafts produce on said device.

3. In a transmitter for telemeter systems a reversible shaft and means for driving it at a speed and in a direction depending on the magnitude and on the positive or negative character of the value to be transmitted, another shaft co-axial with the first mentioned shaft, means for driving said second shaft continuously in the same direction at a constant speed, wheels secured to said shafts co-axial therewith, a planet wheel engaging with both of said wheels, a device for producing electric impulses, means connecting said planet wheel and said device for transmitting to said device the algebraic sum of the influences applied to said shafts, whereby the number of electric impulses produced in said device per unit of time corresponds to the relative velocity of said shafts, and a measuring instrument connected with said device for indicating the algebraic sum of the influence which said shafts produce on said device.

4. In a transmitter for telemeter systems, a device for producing electric impulses, said device comprising two parts one of which is movable with respect to the other and cooperating with each other to produce impulses the number of which per unit of time corresponds to the relative velocity of said parts, two shafts connected with said device for producing the impulses, the relative speed of said parts corresponding to the sum of the influence which said shafts produce on said device for producing the impulses, a measuring instrument for the value to be transmitted driving the first of said shafts, and a driving device for the second shaft independent of the measuring value.

5. In a transmitter for telemeter systems, a device for producing electric impulses, said device comprising two parts, one of which is movable with respect to the other and cooperating with each other to produce impulses, the number of which per unit of time corresponds to the relative velocity of said parts, means for exerting on the movable part a torque of a magnitude depending on the value to be transmitted, means for exerting an additional constant torque on the same part, and a differential means for transmitting the algebraic sum of the influence applied to said part to said device.

6. In a transmitter for telemeter systems, a movable member and means for driving said member at a velocity depending on the value to be transmitted, another movable member and means for driving it at a constant velocity, a device for producing electric impulses, and a differential means connecting said device with both of said movable members for transmitting the algebraic sum of the influence on said movable members to said device whereby the number electric impulses per unit of time corresponds to the relative velocity of said members.

7. In a transmitter for telemeter systems, a movable member and means for driving it at a speed and in a direction depending on the magnitude and on the positive or negative character of the value to be transmitted, another movable member and means for driving it in a single direction at a constant speed, a device for producing electric impulses, and a differential mechanism connecting said device with said movable members to cause the number of impulses produced per unit of time in said device to correspond to the relative velocity of said members.

8. In a transmitter for telemeter systems, a device for producing electric impulses, said device comprising two parts, one of which is movable relatively with respect to the other, a shaft operatively connected with the part which is movable, a meter having a member mounted to turn and operatively connected with said shaft for exerting thereon a torque of a magnitude depending on the value to be transmitted, means likewise operatively connected with said shaft to exert thereon an additional constant torque, and a measuring instrument connected with said device for indicating the algebraic sum of the influences transmitted to said device.

9. In a transmitter for telemeter systems, a reversible shaft and means for driving it at a speed and in a direction depending on the magnitude and on the positive or negative character of the value to be transmitted, another shaft, means for driving said second shaft continuously in the same direction at a constant speed, a device for producing electric impulses, and connecting means for transmitting to said device the algebraic sum of the influences applied to said shafts, whereby the number of electrical impulses produced by said device per unit of time corresponds to the relative velocity of said shafts.

ARNIM OHLHANS.